United States Patent [19]
Harrison et al.

[11] Patent Number: 5,751,369
[45] Date of Patent: May 12, 1998

[54] INFORMATION RETRIEVAL AND PRESENTATION SYSTEMS WITH DIRECT ACCESS TO RETRIEVABLE ITEMS OF INFORMATION

[76] Inventors: Robert G. Harrison, 2120 8th Ave. N., #102, Seattle, Wash. 98109; Robert D. Lamson, 2611 Eastlake Ave. E., #405, Seattle, Wash. 98102

[21] Appl. No.: 641,911

[22] Filed: May 2, 1996

[51] Int. Cl.⁶ ......................................... H04N 7/00
[52] U.S. Cl. ...................... 348/552; 348/553; 348/734; 434/307 R
[58] Field of Search ............................ 348/61, 552, 553, 348/563, 734, 838, 836, 735, 739; 434/307 R

[56] References Cited

U.S. PATENT DOCUMENTS

| | | | |
|---|---|---|---|
| 5,033,969 | 7/1991 | Kamimura | 434/307 R |
| 5,359,367 | 10/1994 | Stockill | 348/552 |
| 5,475,835 | 12/1995 | Hickory | 348/734 |
| 5,513,991 | 5/1996 | Reynolds et al. | 434/307 R |

*Primary Examiner*—Victor R. Kostak
*Attorney, Agent, or Firm*—Hughes, Multer & Schacht

[57] ABSTRACT

Systems (or appliances) which have a learn-then-perform mode of operation. Information is stored in digital form by a data storage device and is retrieved for presentation by: (a) navigating through a hierarchial array of multiple choice menus, or (b) directly and in one fast step by employing identifier codes associated on a one-to-one basis with retrievable items of information. Identifying codes may be obtained as needed from a directory in which each code is associated with a descriptor of the corresponding item of information.

21 Claims, 11 Drawing Sheets

INFORMATION RETRIEVAL AND PRESENTATION SYSTEMS WITH DIRECT ACCESS TO RETRIEVABLE ITEMS OF INFORMATION

TECHNICAL FIELD OF THE INVENTION

The present invention relates to the retrieval of information stored in digital form by: (a) navigating through a hierarchial array of menus, or (b) employing an identifying code to directly access a selected item of information.

BACKGROUND OF THE INVENTION

Application Ser. No. 08/505,969 filed 24 Jul. 1995 and entitled INFORMATION AND ENTERTAINMENT CENTER discloses an information retrieval and display system which includes: (a) a player for a laser readable, data storage device such as a video compact disc, an audio compact disc, a laser disc, or one of the soon to be available digital video discs; and (b) a player for retrieving data from the disc.

Stored on the laser readable disc is data constituting a hierarchy of user-retrievable, multiple choice menus and, for each of the choices in the lowest level menu employed in navigating a particular course through the hierarchy, instructions or other information sought by the user. The selected information can be displayed statically on the screen of the system or presented as a video for visual and audible reception, often as a demonstration of a technique for performing a particular task.

A remote control is employed to access the highest (top) level menu in the hierarchial array. Once the highest level menu is reached, the user is instructed to navigate through the menu hierarchy by using numbered —①— through —⑨—buttons on the remote control to, beginning with the top level menu, select one of the menus available on each successively lower level and to make a choice of the items of information available from the lowest level menu in a particular set of menus. Choices of lower level menus and of items of information are numbered so that the user can make a choice by pressing the correspondingly numbered button.

If the choice from the selected lowest level menu results in a video or audio selection being played (typically one lasting from 30 seconds to 8 minutes), the user is automatically returned to the menu (lower level) from which the selection is made upon completion of the presentation.

If a static display of information is present on the integrated unit screen, that display will stay on the screen until taken off by the user. That is done by pressing a PREVIOUS button on the remote control unit. This returns the user to the menu from which the information was selected.

The PREVIOUS button can also be employed to back the user up through the hierarchy of menus to the top level menu and from the latter to an introductory video stored on the laser readable disc. The user is backed up one step each time this button is pressed.

The introductory video allows a new user to easily use the system to access selected information on the very first try without training or guidance from another person and without consulting written instructions. For many, the elimination of the need to refer to written instructions is of paramount importance as they consider any more than the most rudimentary written instructions distasteful, if not something to be avoided at all costs.

By depressing a single, RESTART button on the remote control, the user can recycle to the beginning of the introductory video after it has finished playing or at any time while the video is playing. This is particularly advantageous to the new user who can thereby easily play the introductory video as many times as is perceived to be necessary to assimilate information which the video presents. The user is thereby relieved of the task of navigating through perhaps the entire hierarchy of menus to reach the initial starting point—top level menu or introductory video.

Pressing the RESTART button later in the navigation of a course through the hierarchial array of menus returns the user to: (a) the top level menu in the hierarchial array, or (b) the introductory video, depending on how the remote control is programmed.

A third, NEXT button allows the user to skip at any point in the introductory video to the highest level menu in the menu hierarchy. Unless the NEXT button is first pressed, the advance to the top level menu will automatically occur when the introductory video ends.

An important advantage of the information retrieval and display system disclosed in the '969 application is that it may be readily converted from use in one environment to use in another environment. All this requires is a disc or other information storage device coded with information appropriate for the alternate purpose. Similarly, added information storage modules can be supplied to increase the amount of information available on a particular subject. The use of easily loaded and replaced information storage devices such as inexpensively supplied compact discs also makes it very practical to combine easily accessed and almost immediately accessible information in different categories which may be useful to one in a particular setting. For example, a hierarchy of menus concerned principally with food selection and preparation may include at one level a menu with choices giving information on or demonstrating first aid procedures for dealing with accidents apt to occur in a kitchen or elsewhere in the environment of a home.

SUMMARY OF THE INVENTION

There have now been invented and disclosed herein new and novel information retrieval and display systems of the character described above. These systems differ from those disclosed previously in that the information retrievable by making a choice from a bottom level menu in a hierarchial array can be accessed without navigating through the array. This is accomplished by: (1) identifying each retrievable item of information with a unique, preferably numerical code; and (2) providing with the system a directory having a brief description of each retrievable item of information and an accompanying identifying code for that item.

To directly retrieve an item of information from an encoded disc, the user of the system first identifies the item of information of potential interest from a directory corresponding to the currently employed data storage device. Once the item is located, the system user enters in sequence the integers making up the identifying code for the item, either via the numbered pushbuttons of a remote control numerical key pad or those of a numerical key pad incorporated in the integrated unit of the information retrieval and display system. The integers making up the code are stored in an onboard buffer incorporated in the integrated unit of the system. The digits are retrieved, using the FIFO (first in, first out) protocol, and employed to generate a command which causes the disc player of the integrated unit to retrieve the selected item of information from the encoded data storage device for presentation on the screen of the integrated unit.

One primary advantage of the present invention as just described is that information of interest can be quickly located via the directory and retrieved directly and in one step instead of by navigating through the hierarchial array of menus encoded on the data storage device. This is of particular significance to those persons who are busy and wish to retrieve needed information quickly or who otherwise do not need, and want to bypass, the coaching provided by navigating through the hierarchial array of menus. At the same time, this novel and important result is obtained in a simple, user-friendly manner and without the expense and complexity of a more complicated microprocessor, additional memory, and/or additional electronics which might be required to accomplish the same result electronically.

The descriptive directory with the accompanying identifying codes may be provided in a variety of formats. One is a single or multipage index; another is a numbered or otherwise coded set of cards. In any case, the directory can be inexpensively made up and manufactured.

The objects, advantages, and features of the invention will be apparent to the reader from the foregoing and the appended claims and as the ensuing detailed description and discussion of the invention proceeds in conjunction with the accompanying drawings.

BRIEF DESCRIPTION OF THE DRAWINGS

FIG. 4 shows, diagrammatically, one representative navigation chart which includes an introductory video and a hierarchy of menus that can be quickly and easily navigated by a user of the FIG. 1 system to reach information of interest stored on a video compact disc or other data storage device;

DETAILED DESCRIPTION OF THE INVENTION

Figure 1:
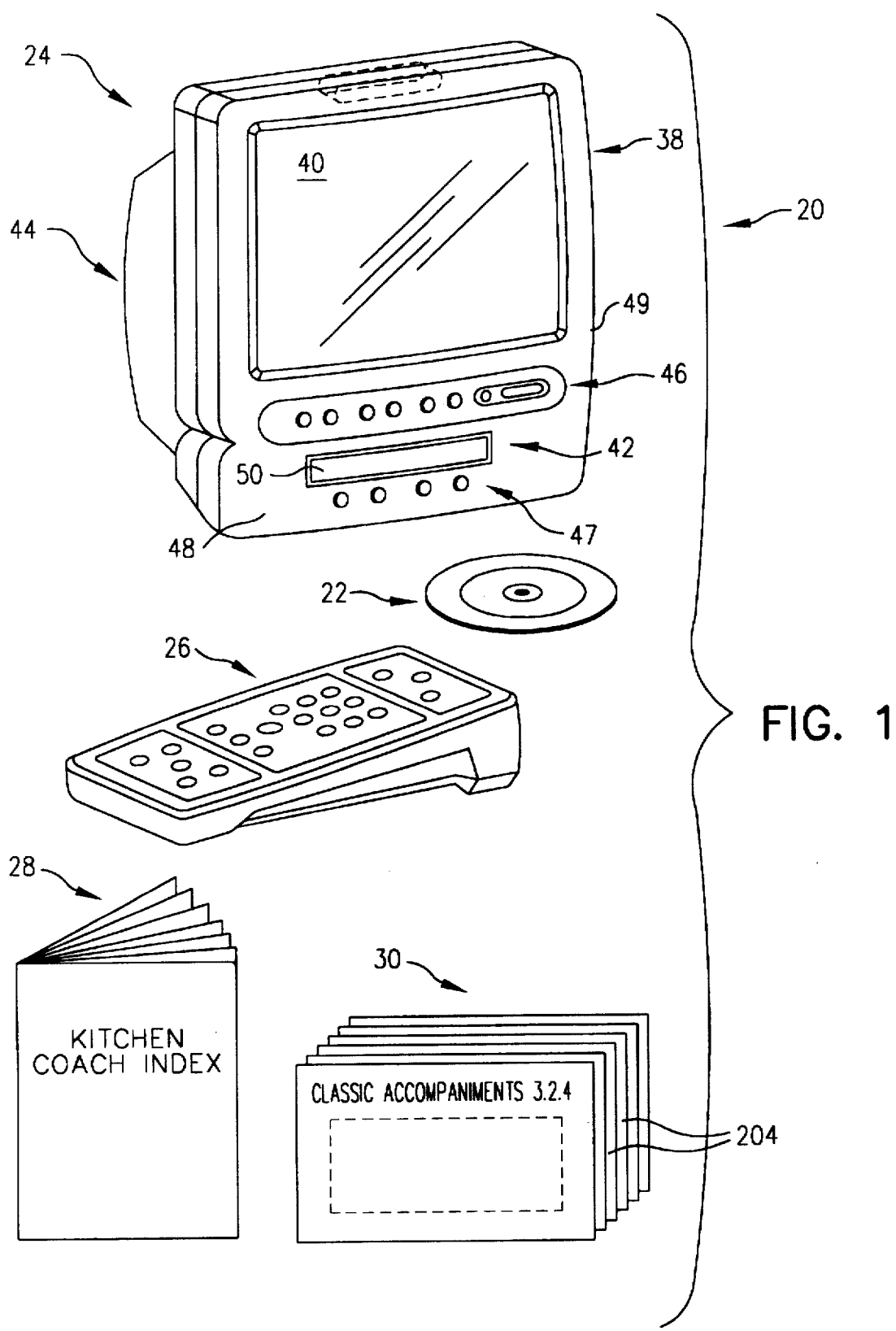
FIG. 1 depicts, pictorially, an information retrieval and display system embodying the principles of the present invention.

Referring now to the drawings, FIG. 1 depicts a system 20 which embodies the principles of the present invention and can be employed in a COACH (or learn-then-perform) mode to retrieve and display information on a subject selected by a system user. The illustrated system is also constructed in an optional manner which allows the system user to easily, and at any time, switch between: (a) a television watching mode of operation, and (b) the COACH mode retrieval and presentation of the information, which is stored in digital form on a data storage device such as the illustrated, encoded, video compact disc 22. The major components of the illustrated exemplary system 20, aside from data storage device 22, are: an integrated unit (or module) 24; a remote control 26; and directories 28 and 30, which are aids used for direct, one-step access of information stored by data storage device 22.

Integrated unit 24 includes a television set 38 with a screen 40 and a video compact disc player 42, both housed in the same cabinet 44. Conventional controls 46 for television set 38 are located on the front panel 48 and one side panel 49 of cabinet 44. Controls 47 for disc player 42 are also located on front cabinet panel 48. A conventional tray 50 is used to load a disc 22 into player 42.

In the interest of making system 20 user friendly, the controls 46 and 47 are preferably color coded. Those controls typically provided and a representative color coding scheme appear in Table 1 below:

TABLE 1

| Control | Color | Function |
|---|---|---|
| TELEVISION | | |
| *Front Cabinet Panel 48* | | |
| ON/OFF | GREEN | Turns television set 38 and disc player 42 on and off, both at the same time |
| Volume+ | GRAY | Increases sound level |
| Volume− | GRAY | Decreases sound level |
| Channel+ | GRAY | Increases channel number by one |
| Channel− | GRAY | Decreases channel number by one |
| *Side Cabinet Panel 49* | | |
| Contrast | BLACK | Shifts or decreases picture contrast |
| Brightness | BLACK | Increases or decreases picture color intensity |
| Color | BLACK | Increases or decreases picture color intensity |
| Tint | BLACK | Shifts picture hue between red and green |
| Sharpness | BLACK | Increases or decreases picture sharpness |
| DISC PLAYER | | |
| *Front Cabinet Panel 48* | | |
| Eject | GRAY | Opens Drawer 50 |
| Play | GREEN | Begins playing video compact disc 22 |
| Stop | GRAY | Stops playing video compact disc 22 |
| Forward | GRAY | Skips forward and plays the next selection on video compact disc 22 |
| Back | GRAY | Skips back and plays the previous selection video on compact disc 22 |

It is not critical that the particular complements of controls identified in Table 1 be employed. Particularly in the case of the disc player, additional controls can be provided for additional modes of operation such as random play, programmed order of play, etc.

Portability is promoted to a significant extent by the integration of television set 38 and disc player 42 into a single module. This reduces to the smallest number the units that must be handled and makes system 20 user friendly by eliminating the external cables that would otherwise be required as well as the onerous and technical task of hooking up the components. Instead, all that is necessary is to locate unit 24 in an appropriate place, plug its external power cord (not shown) into an electrical outlet, and plug a lead from an antenna or cable TV outlet into the unit.

As mentioned above, video compact discs are the currently preferred data storage media as they are easily handled and stored, yet have enough data storage capacity to make available an adequate number of dynamic, visual/audio presentations of information. Also, compact discs are durable and impervious to contamination and rough handling. Nevertheless, it is not essential that this particular type of information storage device be employed. Alternatives include: (a) laser discs which, while perhaps more cumbersome, have the advantage of holding more information than many other types of data storage devices; and (b) audio compact discs, which can be employed in circumstances in which there is nothing to be gained by a visual presentation of information.

Figure 3:
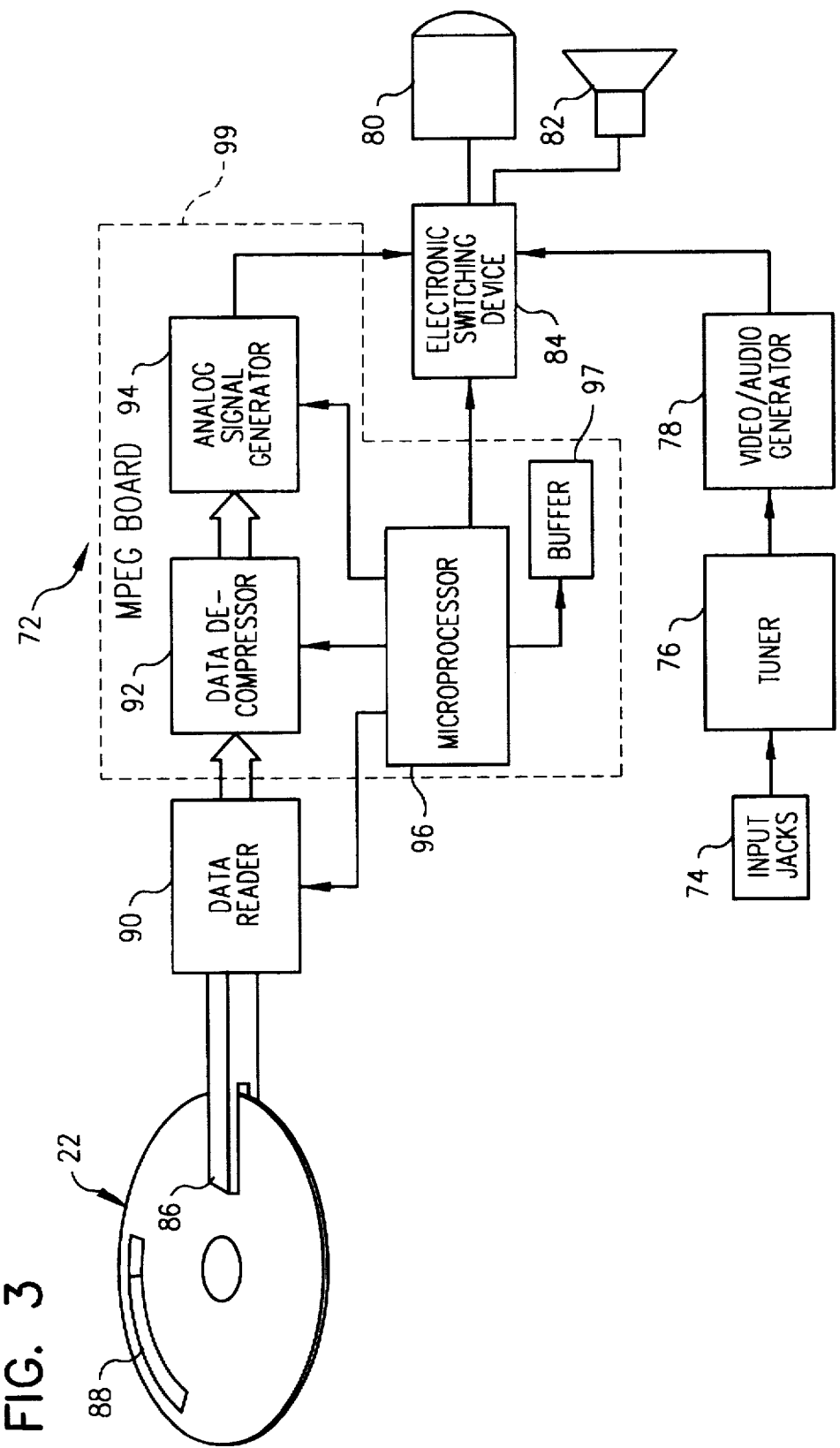
FIG. 3 shows, in schematic form, the operating system of an integrated unit which is another component of the FIG. 1 system; the integrated unit includes a player for an encoded, laser readable disc and a screen on which information retrieved from the disc can be played.

The internal operating components of integrated unit 24 are depicted schematically in FIG. 3 and identified by reference character 72. These components include input jacks which are collectively identified by reference character 74 and are employed to connect the integrated unit to a television signal source—a television antenna or cable and/or a VCR. A tuner 76 is employed by the user to select one of the available television channels to watch or the VCR channel (usually 3 or 4) at the user's location. The selected (off-the-air or VCR) signal is directed to a video/audio generator 78 which converts the selected incoming signal to: (a) a video signal which is converted to visual images by cathode ray tube (CRT) 80 and displayed on the screen 40 of television set 38, and (b) to an audio signal which is converted to audible sound as by the illustrated speaker 82. The video and audio signals are routed to CRT 80 and speaker 82 through an electronic switching device 84 which allows a user to choose between television reception and the retrieval of information from data storage disc 22.

The television set 38 and disc player 42 are powered up together so that integrated unit 24 is always available for use in the COACH mode when unit 24 is turned on. Most system users can be expected to watch television more often than they retrieve stored information. Therefore, mode switching device 84 is typically so programmed or constructed that unit 24 will default to the television mode of operation when that integrated unit is turned on.

Referring still to FIG. 3, video compact disc player 42 has a conventional mechanism (not shown) for spinning laser readable disc 22 and an equally conventional laser pickup 86 for reading information stored in digital data files in the tracks 88 on disc 22. The output from pickup 86 goes to a data reader 90, which outputs a stream of digitally compressed data (the form in which the data is stored on disc 22). The data reader is connected to a decompressor 92 for the data retrieved in the compressed format. After decompression, the data is routed to an analog signal generator 94 which converts the data to video and audio analog input signals utilizable by CRT 80 and speaker 82 to generate visual images and audible sound. The operation of the data reader, the data decompressor, and the signal generator is controlled in a conventional manner by microprocessor 96.

A final, and very significant, component of integrated unit 24 is the buffer identified in FIG. 3 by reference character 97. As is explained in detail below, a system user can directly access and retrieve the information on a selected item of interest from data storage device 22 by pressing those numbered pushbuttons ①—⑨ on remote control numerical key pad 98 which constitute a numerically coded identifier for the selected item. The numbers are stored in buffer 97 in the sequence in which the key pad pushbuttons are pressed and retrieved, using the FIFO protocol. The retrieved sequence of numbers is used by microprocessor 96 to generate a disc player command; and disc player 42 responds by retrieving the identified item of information from data storage device 22 for presentation on television screen 40.

Microprocessor 96 recognizes when the last digit has been retrieved from buffer 97. It interprets this as evidence that all of the numbers in a string making up an identifying code for a particular item of information have been retrieved from the buffer.

Typically, buffer 97, along with microprocessor 96, data decompressor 92, and along signal generator 94, will be located on a MPEG board (identified by reference character 99 in FIG. 3).

Referring now to FIG. 1, the remote control 26 of system 20 frees the user of the system from the location of integrated unit 24. This can, in many applications of the invention, be a feature of particular significance from the viewpoint of convenience, if not that of practicality. For example, in the typical, kitchen application of the invention, this allows the user to access information stored on disc 22 at the location where the user is engaged in the task regarding which information is sought. This contrasts directly with the modus operandi of written and electronic cookbooks which require that the user go to the cookbook location to retrieve information.

Remote control 26 differs from a conventional electronic equipment remote control in that it need not be picked up to be operated but can be conveniently employed while located on a table, countertop, etc., thus requiring only one hand for operation. This feature is of considerable importance because those using a system of the character described herein may simultaneously be engaged in a task which makes it inconvenient, if not impractical, to use a conventional remote control requiring one hand to hold the device and the other to press its operating buttons.

Another important feature of remote control 26 is that the interior 100 of this unit is sealed. This keeps liquids, dust, and other foreign matter apt to be present in kitchen and other environments in which system 20 can advantageously be employed from penetrating to interior 100 of the remote control. Foreign matter can interfere with the operation of, if not actually damage, the internal remote control components.

Remote control 26 includes a casing 101 and a complement of controls collectively identified by reference character 102 for operating integrated unit 24. These controls are preferably of the pushbutton type, with the actuation of each button causing remote control 26 to broadcast a distinctly coded operating signal to the integrated unit. It is preferred that radio frequency (R–F) signals be employed. Signals in this frequency range have a relatively broad dispersion pattern. Therefore, the accuracy with which remote control 26 has to be aimed at the sensor 104 on the front panel 48 of integrated unit cabinet 44 to operate television set 38 or disc player 42 is not critical. This is a significant convenience to a user of system 20 who is engaged in another task while using the remote control and may furthermore be employing the remote control in a tabletop or comparable mode of operation with the remote control so oriented that the axis of propagation of the transmitted signal is not precisely aligned with sensor 104.

Like those on the front and side panels 48 and 49 of integrated unit cabinet 44, the controls 102 of remote control 26 are preferably color coded. Table 2 below identifies a representative set of controls, the colors assigned to the controls, the modulation frequency or bandwidth of the signal transmitted when each of the controls is pressed, and the function of each control.

TABLE 2

| Control | Color | Modulation Frequency | Function |
|---------|-------|---------------------|----------|
| ON/OFF | GREEN | 4100 Hz | Turns television set 38/ disk player 42 on and off |
| TV | GRAY | 4300 Hz | Places the television set 38 of integrated unit 24 and the remote unit controls 102 in the television watching mode |
| COACH | GRAY | 4500 Hz | Plays an introductory video and switches the buttons on remote control 26 to their COACH mode functions so that a user can view the introductory video and/or navigate through a hierarchy of menus to information on a subject of interest |
| RESTART | RED | 6900 Hz | Jumps to the introductory video or a top level menu |
| PREVIOUS | GRAY | 7100 Hz | Retreats to the previous step in a COACH mode sequence |
| PAUSE | GRAY | 7300 Hz | Freezes operation in the COACH mode until pressed again |
| FORWARD | GRAY | 7500 Hz | Advances to the next step in a COACH mode sequence of steps |
| CHANNEL+ | GRAY | 7700 Hz | Selects the next higher television channel |
| CHANNEL− | GRAY | 7900 Hz | Selects the next lower television channel |
| MUTE | GRAY | 8100 Hz | Turns the sound off until pushed again |

Remote control 26 can be employed by the user of system 20 in one technique to navigate through a hierarchial array of multiple choice menus to the item of interest, there being provided on screen 40 of integrated unit 24 at each step a menu offering: (a) choices leading to the next lower level menus, (b) choices identifying items of information which can be retrieved from the storage device 22, or (c) a combination of menu and information item choices. This approach to the retrieval of information from encoded disc 22 may best meet the needs of an inexperienced system user. To further facilitate the needs of the new or less experienced user and to make a refresher available to more experienced system users, the hierarchial menu array may be headed by an introductory video explaining how to use system 20 in the COACH mode.

Referring still to the drawing, the chart 168 in FIG. 4 depicts one representative course that may be navigated to retrieve information on a selected subject from compact disc 22 and to display that information on the screen 40 of integrated unit 24. In this representative example, it is assumed that the user of system 20 is seeking information on stocking a pantry with dry and bottled goods.

First, the reader is reminded that integrated unit 24 defaults to the television reception mode of operation when the on-off switch 170 in remote control complement 102 is pressed to turn on the television set 38 and disc player 42 of the integrated unit. To switch to the learn-then-perform or COACH mode, the user presses COACH button 172. This results in an introductory video 174 being retrieved from disc 22 and played. The introductory video describes the operation of system 20 and tells the user how to reach information on an item of interest. This is done by navigating through a hierarchy of menus such as that hierarchial array identified by reference character 176 in FIG. 4.

A representative system 20 employing the principles of the present invention will typically have up to five levels of menus, and the menus at each level may afford the system user up to nine choices. The hierarchal structure thus "fans out" from level-to-next-lower level, giving the user up to 59,049 choices if five levels are used and if all menus on all levels provide the permitted maximum of nine choices as shown by the following table.

TABLE 3

| Menu Hierarchy Level | Number of Menus | Number of Choices (Descending Order) |
|----------------------|-----------------|--------------------------------------|
| Top (176a) | 1 | 9 |
| Second (176b) | 9 | 81 |
| Third (176c) | 81 | 729 |
| Fourth (176d) | 729 | 6561 |
| Bottom | 6561 | 59049 |

The choices at each level may be information—a static text, graphic, or text/graphic presentation or a video—instead of next lower level menu selections or a mixture of menu selections and information choices. However, it may be desirable to avoid a mixed category to minimize confusion and promote ease of use.

It is emphasized that Table 3 is concerned only with a representative hierarchy of menus. There may be fewer—or more—than five levels in the hierarchy, and the hierarchy may be asymmetric. For example, at the third level of the Table 3 hierarchy, one or more of the menus may be a bottom level menu offering only options for selecting information available from that menu. Present at the same level may be one or more other menus offering choices leading to menus on the next lower (fourth) level.

Figure 2:
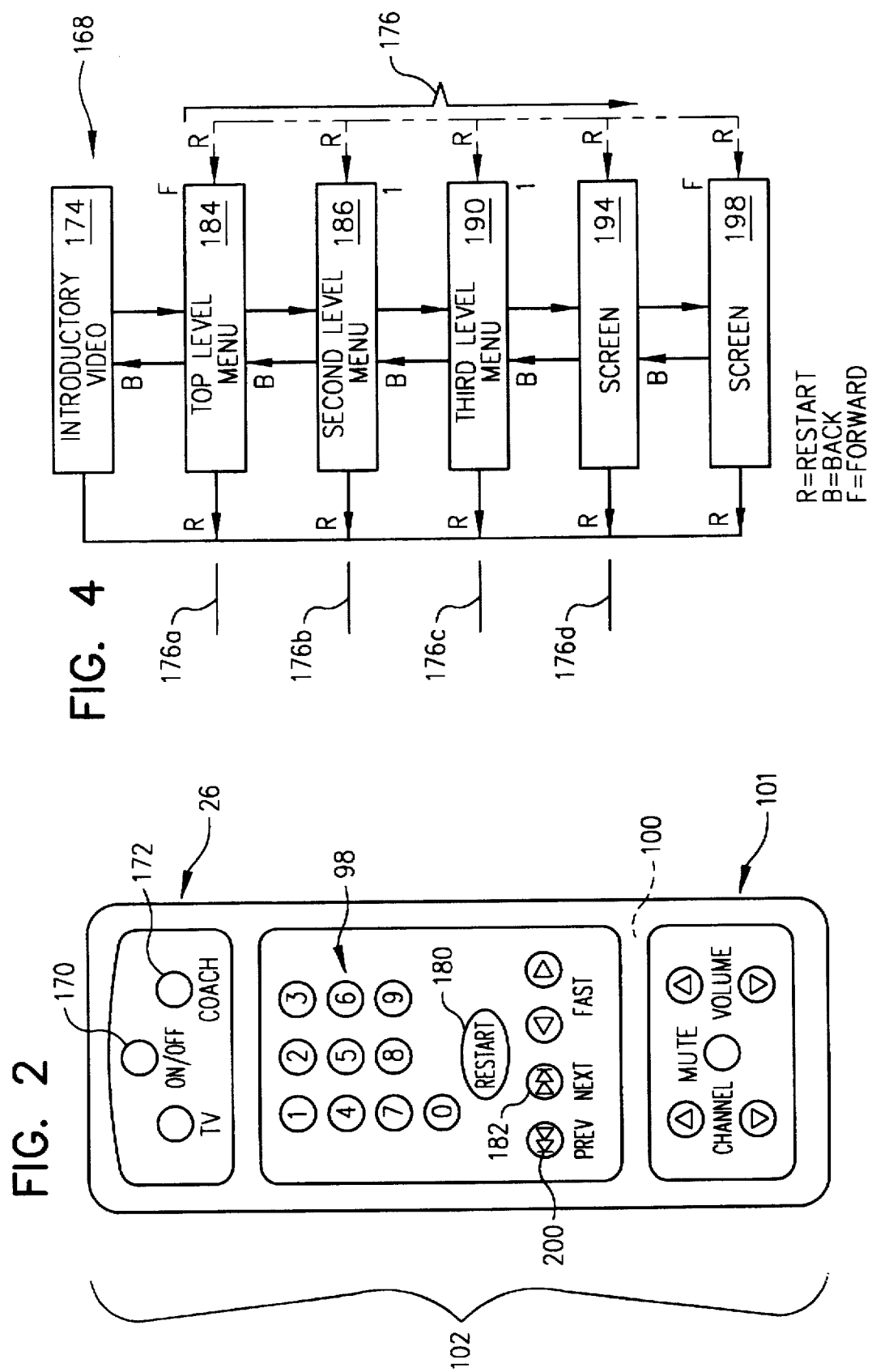
FIG. 2 is a plan view of a remote control which is one component of the FIG. 1 system.

The choices available at each level are preferably limited to nine. These are numbered so that, at every level, a choice can be made by pressing a single, correspondingly numbered one of the buttons ① through ⑨ of remote control numerical keypad 98 (see FIG. 2). This unique feature is another one which makes system 20 easy and convenient to use and therefore acceptable to a person without technical training or inclination and with only the instruction provided by introductory video 174.

Figure 5:
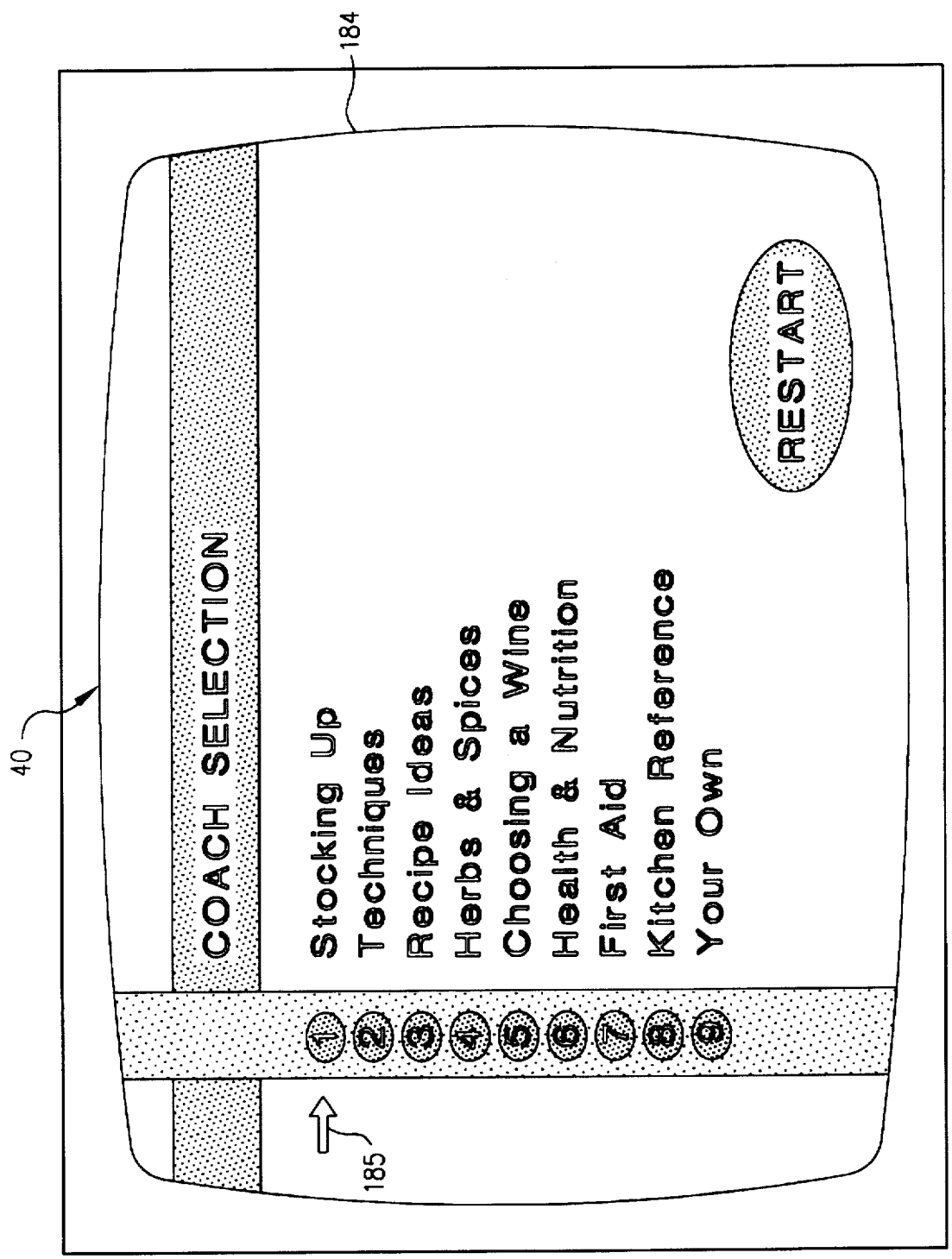
FIGS. 5–7 depict a representative set of menus which would be displayed to a user following a course through the FIG. 4 navigation chart to reach information on dry and bottled goods with which a pantry might be stocked.
Figure 6:
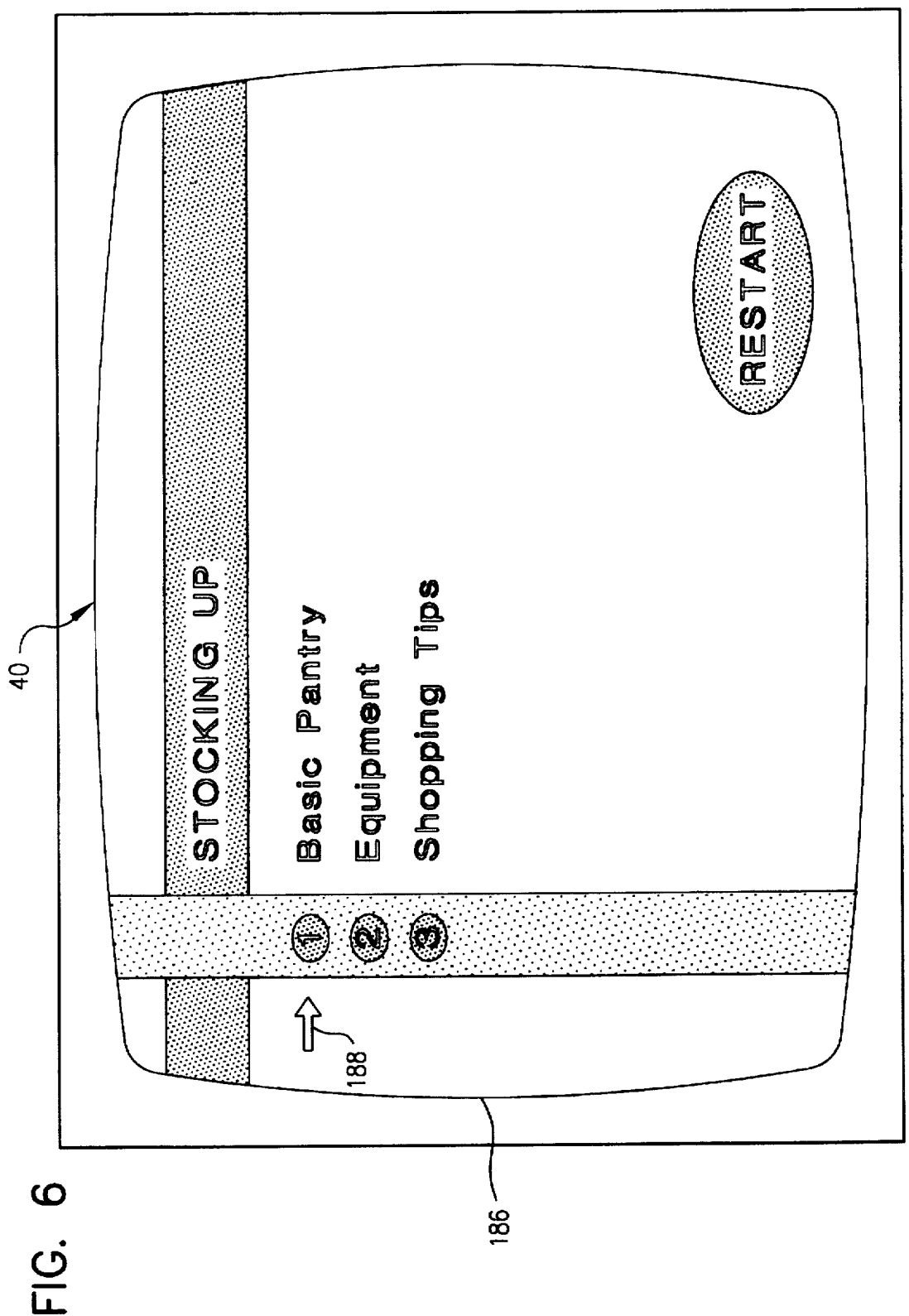
Figure 7:
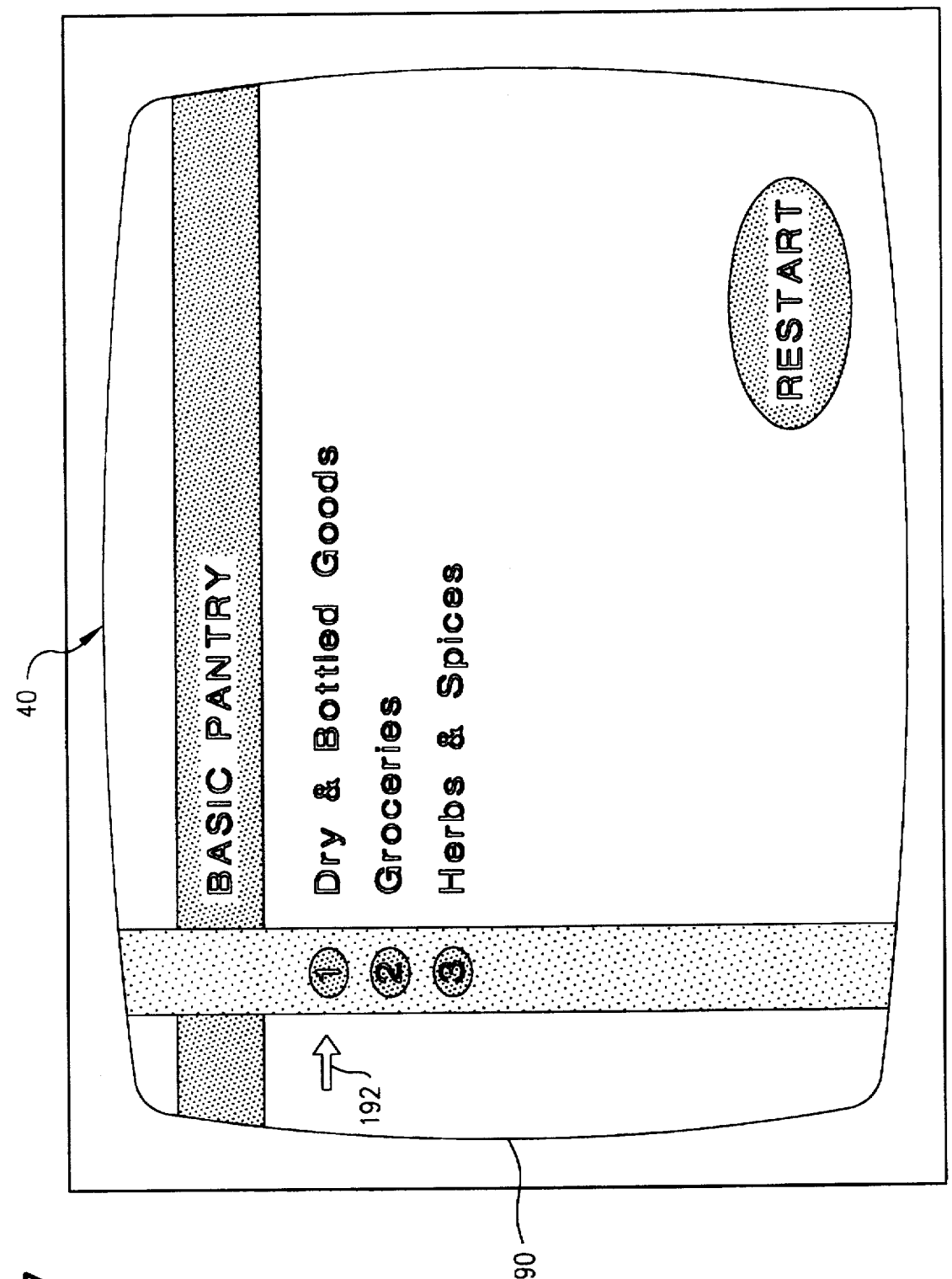

Once the introductory video 174 has been played, the user has two options. One is to press the dedicated RESTART button 180 of remote control 26. This causes the introductory video to be replayed. The second option is to press the also dedicated forward (NEXT) button 182. This results in the top (176a) level menu 184 shown in FIG. 5 being displayed. That menu has nine choices. Choice one is appropriate to reach the information of interest in the representative information selection example under discussion as indicated by arrow 185 in FIG. 5. Therefore, the user presses button ① on remote control numerical keypad 98. This brings up a second (176b) level menu identified by reference character 186 in FIG. 6. This menu offers the user three choices with choice one being appropriate as indicated by arrow 188. Accordingly, the user presses button ① on keypad 98 again at this juncture. This brings up a third (176c) level menu 190 (see FIG. 7). This representative menu also offers the user three choices with choice one again being appropriate as indicated by arrow 192. The user accordingly presses keypad button ① for a third time.

Figure 8:
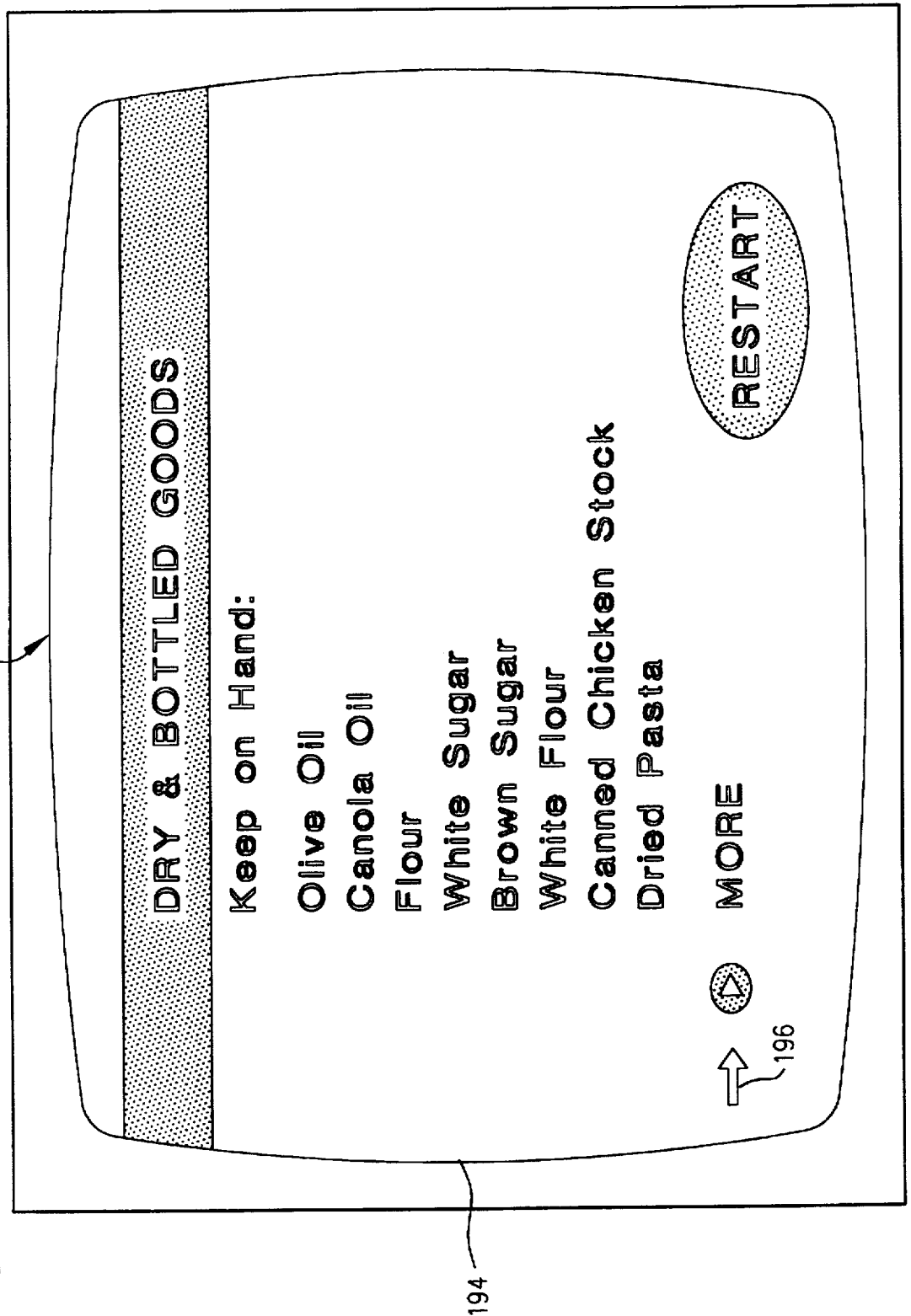
FIG. 8 and 9 are two screens of information which are available for display to the system user when the user makes a choice from the lowest level menu in the hierarchical array depicted in FIG. 4.

Pressing keypad button ① for the third time retrieves and brings to the screen 40 of integrated unit 24 the information on stocking a pantry sought by the user of system 20 because menu 176c is the bottom level menu reached by the exemplary navigation course under discussion. The screen that appears is shown in FIG. 8 and identified by reference character 194. The information sought by the user is displayed in textual form. It remains on screen 40 until further action is taken by the system user.

In this particular example, the information on the selected subject is too voluminous to fit on a single screen. In this and like cases, the legend MORE appears at the bottom of the screen. When that happens, the user can proceed to the next screen as suggested by arrow 196 by pressing remote control NEXT button 182. In the current example, this brings up on screen 40 a second display shown in FIG. 9 and identified by reference character 198.

Screen 198 ends with the legend END OF TEXT. This indicates that all of the information on the subject selected by the system user has been retrieved from disc 22 and displayed on screen 40.

Figure 9:
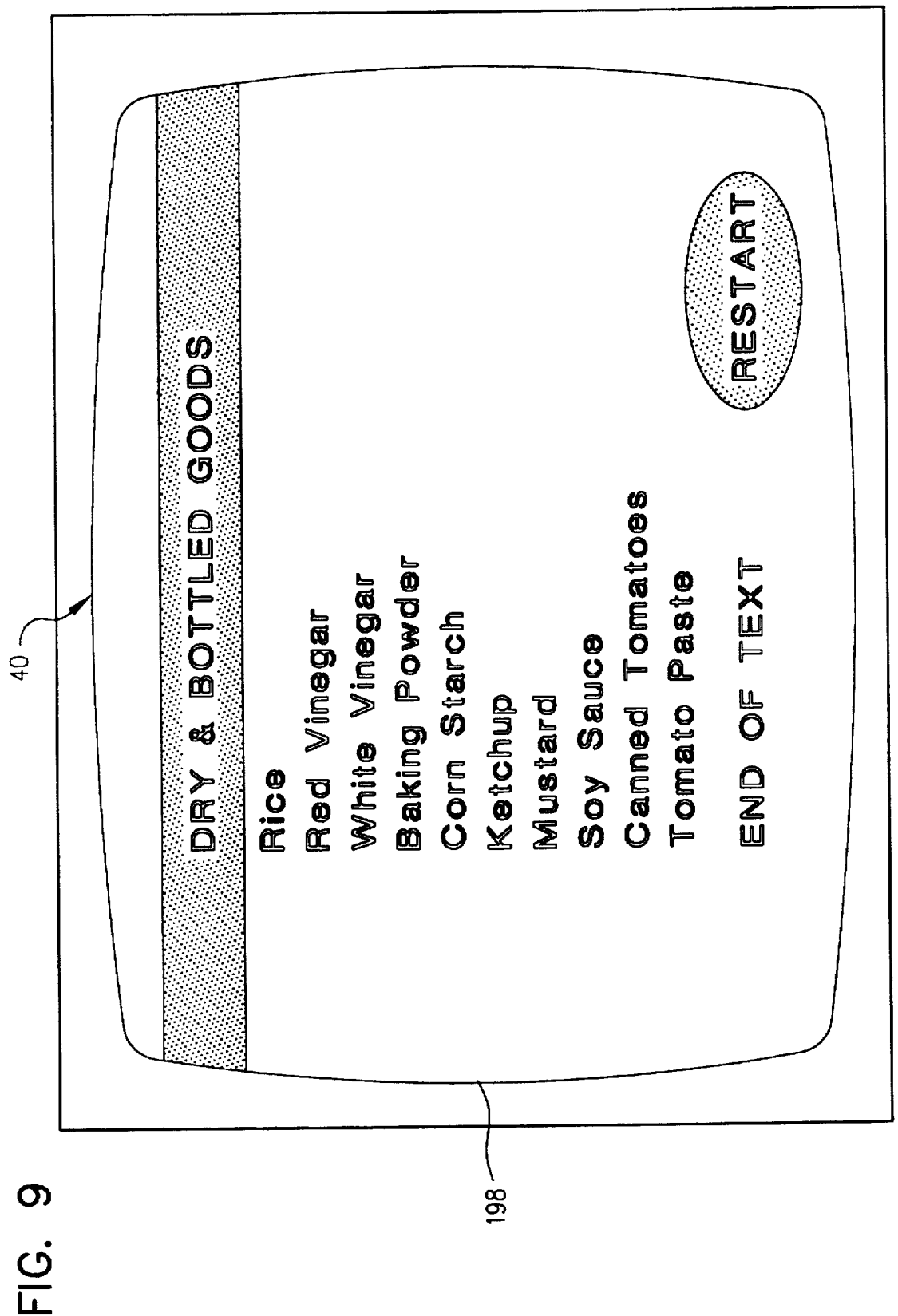

As shown in FIG. 4, the system user can return in one step from any point, be it a menu or a display of information as shown in FIGS. 8 and 9, to the introductory video 174 (or to top level menu 184, depending on which way remote control 26 is programmed). This is done by pressing remote control unit RESTART button 180. RESTART button 180 can also be employed to interrupt a presentation of information on screen 40 and return the system user to the top level menu or the introductory video. This ability to jump back to the top level menu or introductory video by pressing only one button is a significant feature of the invention. It allows a system user, especially an inexperienced one, to at any time easily and immediately rerun part or all of the introductory video if he or she perceives the need for a refreshed recollection of what is available or how to proceed in order to reach information on a subject of interest.

Another comparable, and equally important, feature of the invention is that the system user can back up one step in the step-by-step information accessing process by pressing a dedicated remote control button 200 labeled PREVIOUS. In the example under discussion, for instance, this enables the system user to back up from screen 198 to screen 194, from the latter to third level menu 190, from any menu in the hierarchy to a higher level menu, and from the highest level menu 184 to the introductory video 174. This allows the user to easily and by using only one button review the information presented on screen 40 in a preceding step, to navigate a different path through the available choices, and to return to the introductory video from top level menu 184.

An alternative to the repeated pressing of PREVIOUS button 200 to return to top level menu 184 or introductory video 174 is to use the RESTART button 180 for that purpose. This has the advantage in many instances that the system user can return to the top level menu (or the introductory video) in a single step instead of having to back out to the menu or video in a series of steps with repeated pressing of PREVIOUS button 200.

The arrangement just described is redundant to the extent that the system user can step back from top level menu 184 to introductory video 174 by pressing either PREVIOUS button 200 or RESTART button 180. This is purposeful. It eliminates the need for the system user to remember which button to press in order to reach the introductory video from the top level menu.

Figure 10:
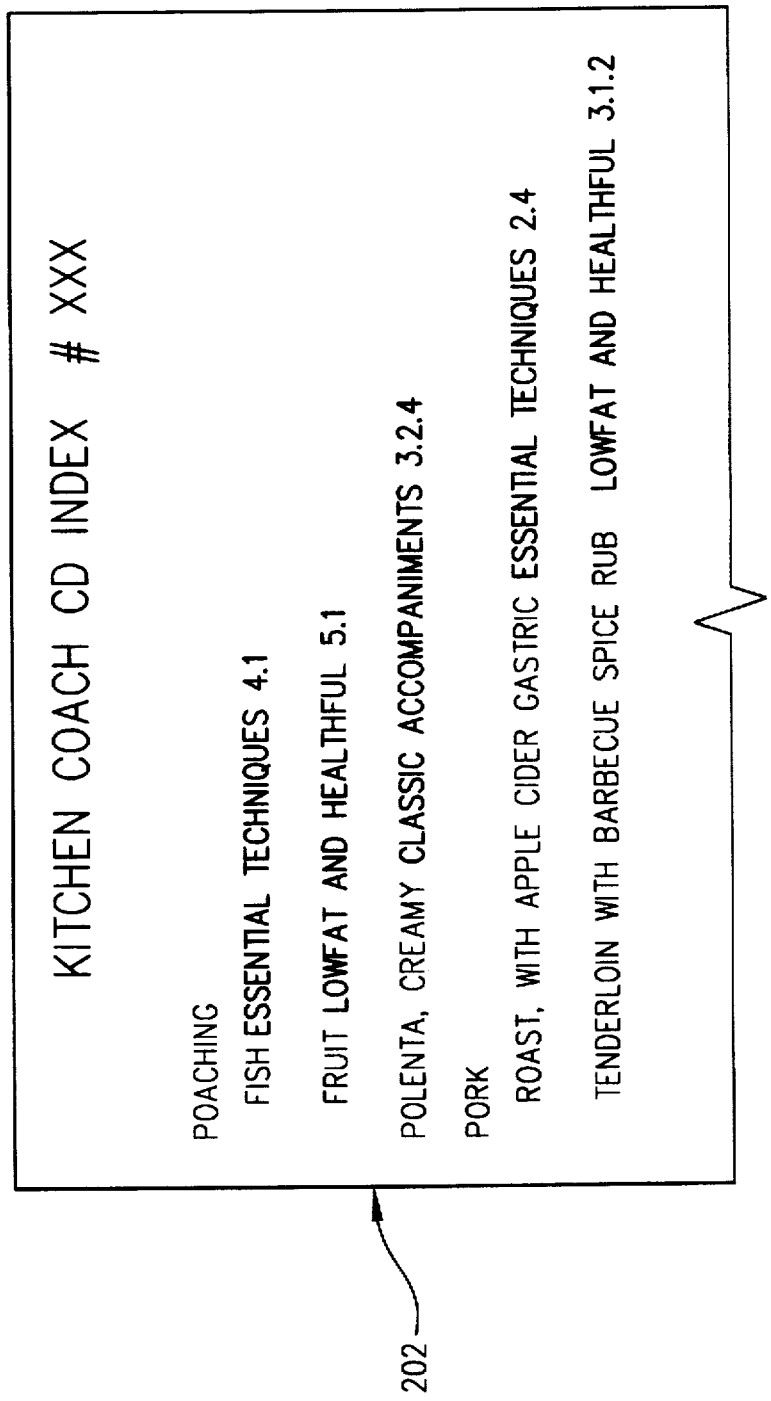
FIG. 10 is a partial view of an index which is one type of directory that is included in the FIG. 1 system to provide direct, one-step access to information otherwise reachable only by navigating through a hierarchy of menus.

Referring still to the drawing, reference character 28 in FIG. 1 identifies an index of booklet form which may be employed to identify: (a) items of information which may be retrieved from encoded data storage device 22, and (b) the identifying codes for those items of information. One representative page of a typical index, in this case designed to accompany a data storage device encoded with information useful to one working in a kitchen, is illustrated in FIG. 10 and identified by reference character 202. Index 28 is formatted in the familiar, indented form with main headings such as POACHING followed by more specific and descriptive, indented entries. This is an advantage because a first-time or inexperienced user is not threatened with an unfamiliar, therefore perhaps intimidating format. In the FIG. 10 example, the first entry under the heading POACHING makes the user of index 28 aware that there can be retrieved from data storage device 22 information matching the descriptor in that entry; viz., basic or essential techniques for poaching fish. The entry also includes the identifying code—4.1—which, when entered into the numerical key pad 98 of remote control 26, will result information on techniques for poaching fish being retrieved from data storage device 22 and presented on the screen 40 of integrated unit 24. In this instance, the information can advantageously be the form of a video clip or a series of video clips demonstrating how to poach fish.

Figure 11:
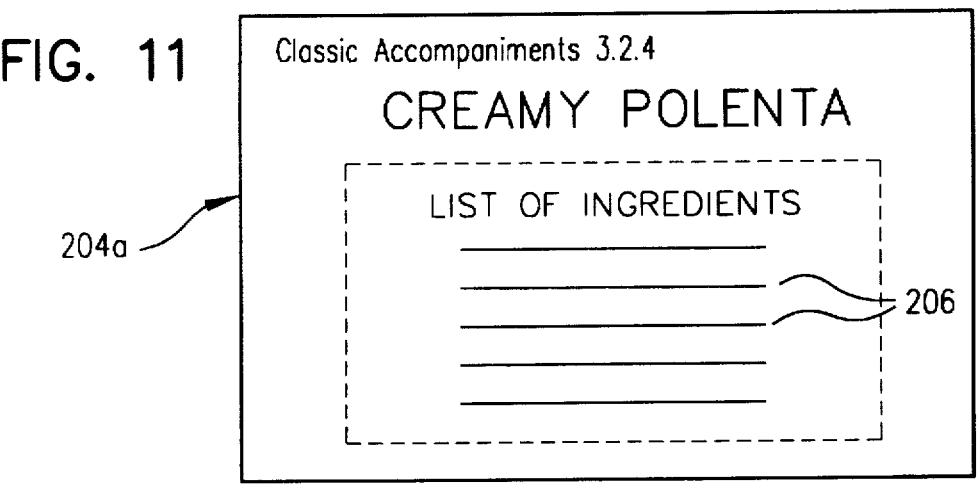
FIGS. 11 and 12 are front and back views of one card from a second, card-type directory that can be used to directly access information stored on the encoded disc in a single step.
Figure 12:
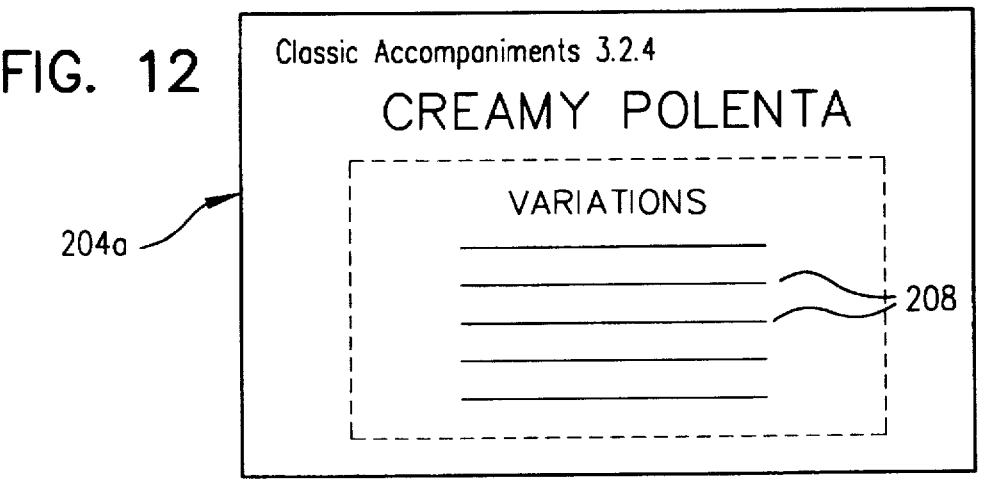

Another representative type of directory, identified in FIG. 1 by reference character 30, consists of a set of cards 204. A representative one of these cards is shown in more detail in FIG. 11 (front view) and in FIG. 12 (back view) and identified by reference character 204a.

Creamy pollenta (see the fourth line down on index page 202) is a classic accompaniment served with a variety of entrees. Index page 202 shows that help in making this dish can be retrieved from data storage device 22 by employing identifier code 3.2.4. The same information can be accessed by leafing through the set 30 of cards 204 until the card headed "Classic Accompaniments" is reached. Opposite the title also appears the identifying code 3.2.4 employed to retrieve the information on making creamy pollenta.

Cards 204 have the advantage that there is sufficient space to list the ingredients required for a recipe on the front of the card (see FIG. 11) if the card is of the typical, three inch by five inch size. Thus, the front of card 204a will list the ingredients required to make creamy pollenta as suggested by the blank lines 206 in FIG. 11. The corresponding space on the back of the card (FIG. 12) can be employed to list ingredients for variations on the basic front-of-the-card recipe as indicated by blank lines 208.

The card is sufficiently small that one can carry it in his or her pocket while shopping. Cards 204 also have the advantage, because of their independence from the hierarchial menu array, that the system user need not be concerned about losing his or her place in a hierarchial navigation course and consequently having to retrace previously taken steps to reach an ingredient list or other collection of related information. Instead, the system user can simply refer to the appropriate card.

Figure 13:
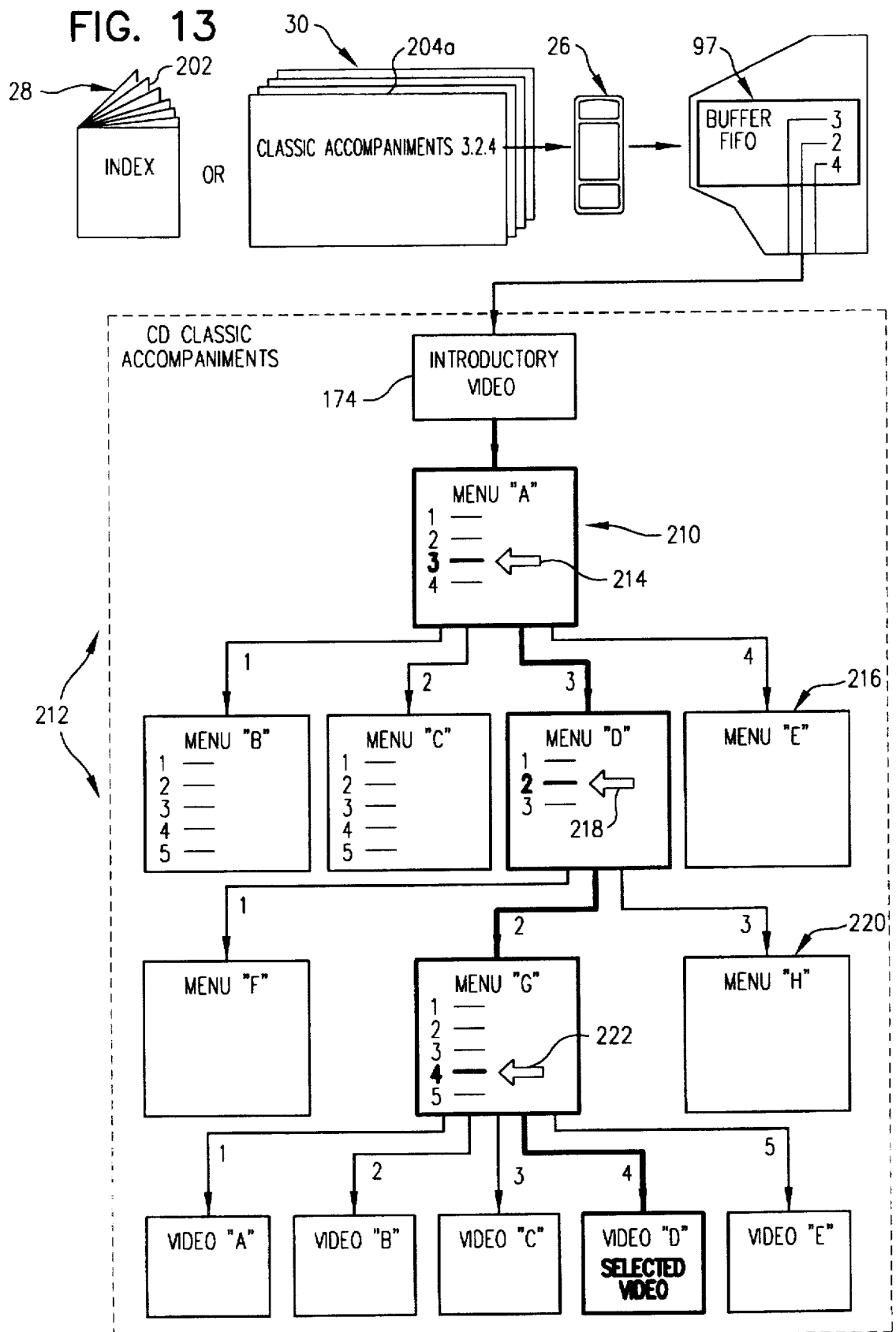
FIG. 13 depicts, diagrammatically, how a selected item of information is directly accessed with the aid of a directory embodying the principles of the present invention.

Referring now to FIG. 13, and continuing with the same example—viz., the making of creamy pollenta—the identifying code 3.2.4 for information on preparing this dish is entered into buffer 97 of integrated unit MPEG board 99 by sequentially pressing buttons ③, ②, and ④ on remote control numerical key pad 98. Buffer 97 is emptied following the FIFO protocol under the control of microprocessor 96. Upon numeral "3" being retrieved from buffer 97, the laser pickup 86 of disc player 42 jumps to choice 3 of the top level (210) menu "A" in the illustrated three-level hierarchial menu array 212 as shown by arrow 214. Sequentially thereafter: (1) the digit "2" is retrieved from buffer 97, and laser pickup 86 jumps to choice 2 of menu "D" in second level of hierarchical array 212 216 as shown by arrow 218; the digit "4" is retrieved from buffer 97 with the laser pickup jumping to choice 4 of menu "G" in the third level 220 of hierarchial array 212 as shown by arrow 222. At this juncture, the addressing by laser pickup 86 of choice 4 from third-level menu G positions the pickup to retrieve a video clip "D" demonstrating how to make creamy pollenta from data storage device 22. That clip is played on screen 40 of integrated system unit 24.

The steps just described are accomplished so quickly that the image on screen 40 does not flicker with the multistep operation, instead being transparent to the system user. This promotes user friendliness by eliminating a possible source of annoyance to the system 20 user.

Another, important to many, feature of system 20 as just described is that the user can jump directly from a display of information on one subject to a display on a different subject. This is accomplished by first pressing remote control RESTART button 180 and then entering with numerical key pad 98 the identifying code for information on the new subject.

Yet another feature of the just-described system which also makes it user friendly is the ability of the integrated unit operating components to ignore extraneous digits erroneously entered by manipulation of the pushbuttons on key pad 98. Thus, if an item of information is reached upon entry of the identifying code 3.2, the system will ignore any subsequently entered digits.

There are of course many variations of the specific, representative embodiments of the invention just described which fall within the compass of its principles. For example, in applications in which the supplied information is too voluminous for a single data storage device, the index entry or card may carry the number of that video compact disc or other data storage device which contains the information on the selected topic. It will also be apparent to the reader that the provision for a television watching mode of operation is neither required nor in many cases desirable. Instead, the system may be limited to a COACH mode of operation for training and comparable applications of the invention. The reader will also realize that it is not essential to use a removable data storage device, let alone one which is laser readable.

Thus, the invention may be embodied in many forms without departing from the spirit or essential characteristics of the invention. The present embodiments are therefore to be considered in all respects as illustrative and not restrictive. The scope of the invention is indicated by the appended claims rather than by the foregoing description, and all changes which come within the meaning and range of equivalency of the claims are intended to be embraced therein.

What is claimed is:

1. An information retrieval and display system which can be employed in a learn-then-perform mode of operation, said system comprising a module which has: (a) a data reader for reading data from an encoded data storage device, and (b) a screen for displaying information generated from data read from said data storage device;

said data storage device having means for storing in digital form data corresponding to: (a) a multiple choice menu, and (b) an item of information which can be retrieved from the data storage device by making a choice from said menu; and said system further comprising:

a directory means for providing direct access to said item of information, said directory means being separate from and physically independent of said module and including an identifying code and a descriptor for each menu choice corresponding to an item of retrievable information; and control means having means for so controlling the operation of the data reader as to cause data representing a selected item of information to be retrieved from said data storage means and the item of information generated from said data presented on said screen when said data reader is activated by the identifying code for the menu choice to which the selected item of information corresponds, said control means also having control elements which are activatable by a system user to generate said identifier code.

2. A system as defined in claim 1 in which said control elements are located on board said module.

3. A system as defined in claim 1 in which said control elements are incorporated in a remote control.

4. A system as defined in claim 3 in which said control elements comprise a numerical key pad.

5. A system as defined in claim 1 in which the information stored by said data storage device provides a hierarchial array of multiple choice menus, at least one item of information being retrievable by making a choice from a bottom level menu in said hierarchy.

6. A system as defined in claim 1 in which the directory means comprises an index card.

7. A system as defined in claim 1 in which said directory comprises a coded set of cards.

8. A system as defined in claim 1 in which said directory means is in book form.

9. A system as defined in claim 1 in which said identifying codes are of multi-digit numerical character and said user activatable control elements are each labeled with a different digit and are sequentially activatable by the system user to generate each distinct identifier code.

10. An information retrieval and display system which can be employed in a learn-then-perform mode of operation, said system comprising a module which has: (a) a data reader for an encoded data storage device, and (b) a screen for displaying information generated from data retrieved from said data storage device;

said data storage device having means for storing in digital form data corresponding to: (a) a multiple choice menu; and (b) an item of information which can be retrieved from the data storage device by a system user making a choice from said menu, said system further comprising:

(a) a directory means which is separate from and physically independent of said module, and (b) control means having means which, upon said choice being made: (c) causes said data reader to read data identified by said choice from the storage device, and (d) causes said item of information to be generated from said data and presented on said screen;

said directory means including a different, multi-digit numerical identifying code and descriptor for each menu choice corresponding to an item of retrievable information; and said control means comprising: (a) control elements which are activatable by said system user to generate signals representing the distinct identifier code for the user selected item of information, (b) buffer means for storing said signals in the order in which they are generated, and (c) means for identifying the last in the series of those signals representing the identifier code and then retrieving the signals from said buffer in the order in which they were stored in said buffer and activating said data reader to retrieve from said storage device the data from which the selected item of information can be generated.

11. A system as defined in claim 10 in which said control elements are located on board said module.

12. A system as defined in claim 10 in which said control elements are incorporated in a remote control.

13. A system as defined in claim 12 in which said control elements comprise a numerical key pad.

14. A system as defined in claim 10 in which the information stored by said data storage device provides a hierarchical array of multiple choice menus, at least one item of information being retrievable by making a choice from a bottom level menu in said hierarchy.

15. A system as defined in claim 10 in which the directory means comprises an index card.

16. A system as defined in claim 10 in which said directory comprises a coded set of cards.

17. A system as defined in claim 10 in which said directory means is in book form.

18. An information retrieval and display system which can be employed in a learn-then-perform mode of operation, said system comprising a module which has: (a) a data reader for an encoded data storage device, and (b) a screen for displaying information generated from data retrieved from said data storage device;

said data storage device having means for storing in digital form data corresponding to: (a) a multiple choice menu means; and (b) first and second items of information which can be retrieved from the data storage device by a system user making choices from said menu means; and said system further comprising: (a) a directory means which is separate from and physically independent of said module; and (b) control means having means which, upon a choice being made from said menu means: (c) causes said data reader to read data identified by said choice from the storage device; and (d) causes said item of information to be generated from said data and presented on said screen; and said control means including a different identifying code and a descriptor for each menu choice corresponding to an item of retrievable information; and said directory means comprising a single dedicated control element which can be employed by a system user during or following the presentation of said first item of information to reset said control means for the acceptance of the identifier code corresponding to the second item of information.

19. A system as defined in claim 10 in which the multiple choice menu means provides a hierarchical array of multiple choice menus, said first and second item of information being retrievable by making a choice from a bottom level menu in said hierarchy.

20. A system as defined in claim 10 in which:

said module comprises means for playing a television image on said screen; and said control means comprises means actuatable by a user to switch the operation of said system between: (a) said learn-then-perform mode of operation, and (b) a television watching mode of operation.

21. A system as defined in claim 18 in which data stored by said data storage device corresponds to an introductory video, said module defaulting to the retrieval and playing of the introductory video upon operation of said module in the learn-then-perform mode of operation being selected.

* * * * *